United States Patent
Vermeulen

[11] 3,792,955
[45] Feb. 19, 1974

[54] ARTICLE TRANSFER APPARATUS
[75] Inventor: Emile R. Vermeulen, Gent, Belgium
[73] Assignee: Sidaplax, a societe anonyme (Naamloze Vennootschap), Gentbrugge, Belgium
[22] Filed: Jan. 27, 1972
[21] Appl. No.: 221,319

[30] Foreign Application Priority Data
Jan. 29, 1971 Great Britain ..................... 3,509/71

[52] U.S. Cl. ................................ 425/443, 425/436
[51] Int. Cl. ............................................... B29c 7/00
[58] Field of Search 425/436, 437, 441, 443; 193/6, 193/30; 214/7; 264/334

[56] References Cited
UNITED STATES PATENTS

| | | | |
|---|---|---|---|
| 2,345,012 | 3/1944 | Sillars | 214/7 |
| 2,725,992 | 12/1955 | Wells | 214/7 |
| 2,744,286 | 5/1956 | Carpenter et al. | 425/437 X |
| 2,968,382 | 1/1961 | Oury | 193/6 X |
| 3,040,378 | 6/1962 | Rodgers et al. | 425/437 X |
| 3,337,064 | 8/1967 | Moyden et al. | 214/7 |
| 3,659,998 | 5/1972 | Saffron | 425/437 X |
| 3,660,002 | 5/1972 | Morroni | 425/437 X |

FOREIGN PATENTS OR APPLICATIONS
997,217 7/1965 Great Britain

*Primary Examiner*—Richard B. Lazarus
*Attorney, Agent, or Firm*—Michael J. Murphy

[57] ABSTRACT

Successively formed articles are individually rapidly transferred from a mold to a collection station by a relatively compact feed means which is movable from an article receiving position adjacent the mold to an article ejecting position within the forward end of a chute feeding the collection station.

2 Claims, 1 Drawing Figure

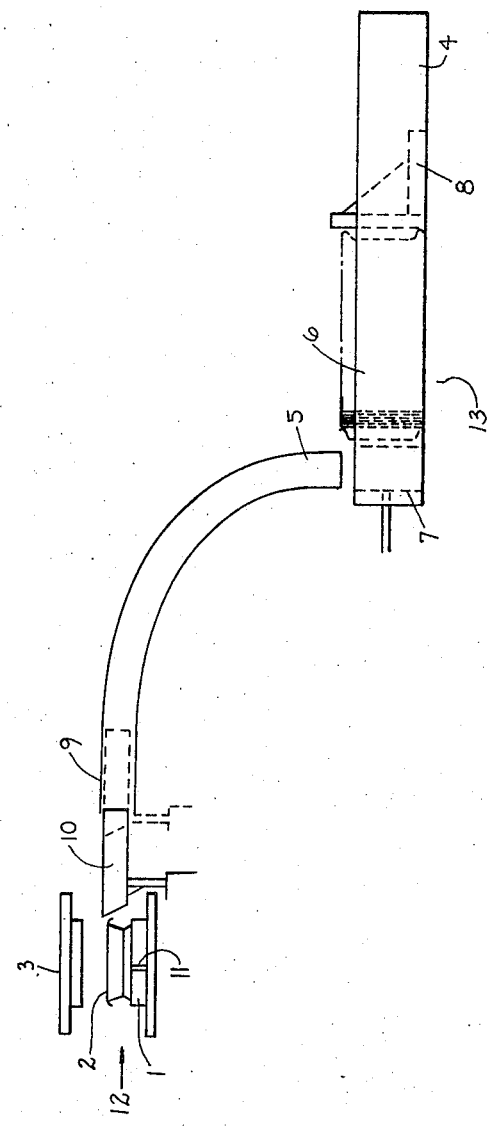

ARTICLE TRANSFER APPARATUS

BACKGROUND OF THE INVENTION

This invention relates to transfer apparatus, and particularly to apparatus for removing a succession of articles from a mold.

The production of articles by methods involving shaping a material in a mold has been practiced for thousands of years but has in the twentieth century assumed tremendous importance in the plastics industry. For example, many millions of articles such as packaging containers are produced annually by processes of forming thermoplastic sheet in a mold, either by differential fluid pressure or by matched male and female molds. The production rate achievable by such methods is very high, speeds up to twenty-five forming cycles per minute per mold being not uncommon, and it is necessary to provide suitable means for removing the articles quickly from the mold area and conveying them away from the immediate vicinity of the forming machine. Often, and particularly where the articles are tray-like packaging containers, an attempt is made to deliver each successive tray in substantially the same position and orientation so that for example they can be stacked one within the other.

For example, where thermoplastic sheet material is supplied to the machine as a continuous web, a formed article may be conveyed away from the mold by advancing the web of which it still forms part, then the formed article is later severed from the remaining parts of the web and is blown downwardly onto a stack of preceding articles. The method, however, cannot be used where severance of successively formed articles from a continuous web takes place while the article remains in the mold, or in forming processes utilizing precut blanks or in injection molding processes, because there is no web to transport the article away from the mold.

It has also been proposed to employ a rather bulky, elongated chute which moves into and out of engagement with the mold and delivers the articles to a receptacle for the stack, each successive article being pushed into stacked relation to its predecessors by a reciprocating ram. This proposal works well up to a certain rate of production but has serious disadvantages at higher rates. Movement of the ram has to be synchronized with that of the chute, and this becomes progressively more difficult to consistently accomplish as the production rate increases. Moreover, the ram stroke needs to be made long so as to allow for variations in the position of the chute with respect to the ram after long periods of operation, and this means that an article may sometimes fall flat or into a sloping position before the ram has had time to act on it with the result that this and adjacent already stacked articles are damaged. It is also found that at high production rates, for example 40 articles per minute or more, the stresses on the chute and even on the molding machine itself as a result of repeated movements of the chute assembly can result in mechanical failure. This can be expensive if a valuable mold closes on the immobilized chute as a result of this.

SUMMARY OF THE INVENTION

Accordingly, it is an object of this invention to provide an improved, durable apparatus arrangement for transferring successively formed articles from a mold to a collection station.

An additional object of this invention is to provide such an apparatus arrangement which is capable of consistently and accurately operating at high speeds.

Other objects of this invention will in part be obvious and will in part appear hereinafter.

These and other objects are accomplished by providing an apparatus for removing successively formed articles from a mold and for depositing them with controlled orientation at a collection station, this apparatus comprising in combination, a reciprocable member for opening and closing the mold, a fixed chute for the articles intermediate the mold and collection station, feed means for successively transferring the articles from between the member and mold to the chute, the feed means being movable between an article receiving advanced position between the separated member and open mold and an article ejecting retracted position projecting into the feed end of the chute, the latter position allowing the member to close the mold.

Preferably arrangements are made to stack the delivered articles one adjacent to and preferably within the other.

It is to be understood herein that the term "stacking" includes horizontal as well as vertical stacking or stacking at an angle to the horizontal.

BRIEF DESCRIPTION OF THE DRAWING

In describing the overall invention, reference will be made to the accompanying Drawing which is a schematic, vertical view of apparatus embodying the present invention.

DETAILED DESCRIPTION OF THE DRAWING

The apparatus is shown in conjunction with a mold having a planar oriented cavity therein conforming to the shape of the article being formed. Such articles 2 may be pressure formed from thermoplastic sheet material such as for example biaxially oriented polystyrene sheet sold under the registered Trade Mark "Polyflex." For the purpose of exemplification, articles 2 are shown as shallow packaging trays and in the description below are referred to as "trays," but other articles can be produced by an appropriate choice of mold and corresponding modifications as required to the dimensions of the other parts of the apparatus.

Mold 1 is closed at some time in each forming cycle by a reciprocable platen member 3 (shown in its open position). The other parts of the pressure forming machine are conventional and are not shown. The apparatus further comprises a collection station 13 which includes a receptacle for stacked trays in the form of a trough 4 of cross-section slightly larger than the outline of a side elevation of a tray. A fixed chute 5, above trough 4 intermediate mold 1 and collection station 13, also of cross-section slightly larger than the outline of a side elevation of a tray, is so positioned that a tray moving down it is delivered to trough 4 in the correct position and orientation for horizontal movement onto stack 6. Such horizontal movement is supplied by means of a reciprocating ram 7 for advancing an article 2 delivered into trough 4 from chute 5 against the previously delivered article. The stroke of ram 7 is greater than the overall depth of a single tray 2 but considerably less than the width of a tray so that a tray delivered from the chute is maintained at at least 45° to the horizontal even when the ram is fully withdrawn from the stack. There is thus no danger of a tray falling flat or at such a degree of slope that the advancing ram cannot lift it into a vertical position. A sliding stop 8 is placed at the right hand end of the stack to maintain the stacked trays upright and give some frictional resistance that ensures the trays are properly nested together under the action of the ram.

The upper feed end 9 of chute 5 is enlarged to accommodate feed means for successively transferring the articles 2 from between platen member 3 and mold 1 to chute 5. Such feed means includes a horizontal feeding duct 10 movable between an article feeding advanced position between the separated platen and open mold and an article ejecting retracted position projecting into feed end 9 of chute 5, this latter position allowing platen 3 to close on mold 1. As mentioned, duct 10 is arranged so as to slide telescopically within this enlarged feed end of chute 5. Duct 10 is preferably relatively small, the hollow interior being approximately the size of an article 2. Such telescopic sliding movement of duct 10 moves the left-hand end of the duct towards (full lines in the drawing) and away (dash lines in the drawing) from the mold 1 and is synchronized with the mold closing mechanism so that the duct is clear of the mold when the latter is closed but is brought up to the mold when a newly-formed tray is to be ejected. Means are also provided for ejecting each article 2 from mold 1 when the latter is in open position. Such means may be, for example, a mechanically or hydraulically operated ejection mechanism, or compressed air forced into the mold cavity from below through apertures 11, the ejected tray being blown into the duct 10 by a blast of air 12 and thence down the chute 5 to the trough 4, travel along the contoured chute 5 serving to orient each article 2 open end forward at 90° from the planar position of mold 1. Reciprocable movement of the ram 7 is synchronized with the mold opening and closing mechanism so that it is withdrawn to the left before a tray arrives down the chute and thereafter moves to the right so as to add the tray to the stack. It then moves back to the left in readiness for arrival of the next tray.

The low mass of duct 10 reduces the stresses caused by acceleration and deceleration each time the duct starts and stops when the mold is opened or closed, so that much faster operation of the machine, for instance at 50 or even 60 forming cycles per minute is possible and there is greatly reduced risk of damage to the mold as a result of closing on an immobilized chute. Moreover, the fixed chute delivers successive trays in substantially the same position and orientation so that the stroke of ram 7 can be reduced. Thus there is no need for tedious adjustment of the ram timing so as to ensure that it meets each tray before the tray can fall into a position where the ram cannot act on it properly.

The previous description and particularly the drawing is for purposes of illustration only and is not to be taken in a limited sense.

Variations of the above apparatus are possible. For example, the mold can contain two cavities so that two articles are produced in each forming cycle; here two chutes and feed ducts would be provided with the chutes arranged to deliver the articles from each mold cavity one behind the other, and the stroke of the ram would be slightly more than twice the overall depth of a tray. This arrangement is particularly useful where the two mold cavities are made slightly different from each other so that an article from either cavity will not wedge tightly into an article from the other cavity.

Alternatively, where more than one mold cavity is employed, either of the above arrangements can be duplicated side-by-side so that two or more stacks are produced.

Instead of a blast of air to blow the article into duct 10, a ram can be used to perform this action mechanically.

Although not usually preferred, the feed means can alternatively for example comprise some form of gripping jaw that transfers articles from the mold to the chute.

Articles of thermoplastic resins that can be formed in an apparatus according to the invention include those of polymers and copolymers of olefinically unsaturated monomers, for example polyvinyl chloride (plasticized or unplasticized), polystyrene, toughened polystyrene containing a rubber, acrylonitrile-butadiene-styrene (ABS) resin, a styrene-acrylonitrile copolymer, polymethyl methacrylate, polyethylene (high or low density material), polypropylene, or a copolymer of ethylene and vinyl acetate. Such resins can where appropriate be in foamed or orientated form if desired. Examples of other thermoplastic substances are nylons, polyethylene terephthalate, cellulose acetate and glass, although the brittle nature of latter would necessitate appropriate cushioning at the end of the chute to avoid breakage. The apparatus of the invention is also applicable to articles of thermosetting resins such as urea/formaldehyde and phenol/formaldehyde resins.

The invention may be used with vacuum-forming, injection molding, compression molding, blow-molding and injection blow molding machines, as well as machines for shaping materials other than thermoplastic resins, for instance paper, paper pulp, cardboard or fibreboard, sheet metal or metal foil. Applications apart from stacking where articles are required to be delivered in a desired position and orientation include printing and container-filling.

It is obvious that many variations may be made in the concepts set forth herein without departing from the spirit and scope of this invention, as hereinafter claimed. The following advantages of the invention are obtained:

1. The weight of reciprocally moving parts can be reduced approximately 10-fold, for example from 15-20 kilograms to 1½-2 kilograms.
2. The stroke of the ram can be approximately halved, for example from 8-10 centimetres to 5-6 centimetres.
3. The speed of the forming machine can be increased by approximately 50 percent, for example from 35 cycles per minutes to 50 cycles per minute.

I claim:

1. Apparatus for removing successively formed articles from a mold and for depositing them at a collection station which comprises, in combination, a reciprocable member for opening and closing said mold, a fixed chute for the articles intermediate the mold and collection station, feed means for successively transferring the articles from between the member and mold to the chute, said feed means being movable in a direction substantially perpendicular to that of said reciprocable member between an article receiving advanced position between the reciprocable member and open mold and an article ejecting retracted position projecting into the feed end of the chute, said latter position allowing the member to close the mold, said collection station including a trough beneath the chute and a reciprocable ram for advancing an article delivered into the trough from the chute against the previously delivered article, said ram being synchronized with the reciprocable member such that it is in its rearward position when the mold is open, said mold containing a planar oriented cavity conforming to the shape of a tray-like container, said chute being contoured downwardly so as to orient said article open end forward at 90° from said planar position during passage from the mold to the collection station.

2. Apparatus for removing successively formed articles from a mold and for depositing them at a collection station which comprises, in combination, a reciprocable member for opening and closing said mold, a fixed chute for the articles intermediate the mold and collection station, feed means for successively transferring the articles from between the member and mold to the chute, said feed means being movable in a direction substantially perpendicular to that of said reciprocable member between an article receiving advanced position between the reciprocable member and open mold and an article ejecting retracted position projecting into the feed end of the chute, said latter position allowing the member to close the mold, said feed means comprising a relatively small duct, the hollow interior of which is approximately the size of one of said articles, said duct being telescopically movable in the feed end of the chute.

* * * * *